US009621409B2

(12) United States Patent
Oliver et al.

(10) Patent No.: US 9,621,409 B2
(45) Date of Patent: Apr. 11, 2017

(54) SYSTEM AND METHOD FOR HANDLING STORAGE EVENTS IN A DISTRIBUTED DATA GRID (75) Inventors: Brian Oliver, Acton, MA (US); Noah Arliss, Lexington, MA (US); Gene Gleyzer, Lexington, MA (US); Robert H. Lee, San Carlos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1178 days.

(21) Appl. No.: 13/462,720

(22) Filed: May 2, 2012

(65) Prior Publication Data

US 2013/0074083 A1   Mar. 21, 2013

Related U.S. Application Data (60) Provisional application No. 61/535,238, filed on Sep. 15, 2011.

(51) Int. Cl.
*G06F 17/30* (2006.01)
*H04L 12/24* (2006.01)
*G06F 9/54* (2006.01)
*H04L 29/08* (2006.01)
*H04L 29/06* (2006.01)

(52) U.S. Cl.
CPC ........ *H04L 41/0631* (2013.01); *G06F 9/542* (2013.01); *G06F 17/30575* (2013.01); *H04L 67/1097* (2013.01); *H04L 67/16* (2013.01); *H04L 67/42* (2013.01); *G06F 2209/542* (2013.01)

(58) Field of Classification Search
CPC .......... G06F 17/3071; G06F 17/30864; G06F 17/30598
USPC ...................................................... 707/737
See application file for complete search history.

(56) References Cited

U.S. PATENT DOCUMENTS 5,625,821 A * 4/1997 Record et al. ................ 718/100
6,512,519 B1   1/2003 Arsenault et al.
7,624,118 B2 * 11/2009 Schipunov ........ G06F 17/30545
7,644,087 B2   1/2010 Barkai et al.
(Continued)

FOREIGN PATENT DOCUMENTS

JP   2006146789   6/2006

OTHER PUBLICATIONS

Pietzuch, Hermes: A Scalable Event-Based Middleware, Feb. 2004, retrieved on Feb. 15, 2012, https://www.doc.ic.ac.uk/~prp/manager/doc/thesis/prp_thesis.pdf>, pp. 12, 21, 22, 26, 42, 43, 87, 88.
(Continued)

*Primary Examiner* — Belix M Ortiz Ditren
(74) *Attorney, Agent, or Firm* — Tucker Ellis LLP (57) ABSTRACT A system and method can handle storage events in a distributed data grid. The distributed data grid cluster includes a plurality of cluster nodes storing data partitions distributed throughout the cluster, each cluster node being responsible for a set of partitions. A service thread, executing on at least one of said cluster nodes in the distributed data grid, is responsible for handling one or more storage events. The service thread can use a worker thread to accomplish synchronous event handling without blocking the service thread.

20 Claims, 5 Drawing Sheets

(56) References Cited

U.S. PATENT DOCUMENTS

| | | | |
|---|---|---|---|
| 8,453,149 B2* | 5/2013 | Ben Yehuda | G06F 9/45533 718/1 |
| 8,458,695 B2* | 6/2013 | Fitzgerald et al. | 718/1 |
| 9,329,899 B2* | 5/2016 | Ailamaki | G06F 9/4843 |
| 2003/0050983 A1 | 3/2003 | Johnson | |
| 2003/0158632 A1 | 8/2003 | Nierlich et al. | |
| 2004/0181775 A1* | 9/2004 | Anonsen et al. | 717/104 |
| 2006/0190243 A1 | 8/2006 | Barkai et al. | |
| 2008/0127217 A1 | 5/2008 | Wang | |
| 2009/0252175 A1 | 10/2009 | Dempo | |
| 2009/0292877 A1 | 11/2009 | Piper | |
| 2010/0235118 A1 | 9/2010 | Moore | |
| 2011/0099329 A1* | 4/2011 | Shafi | 711/112 |
| 2013/0047165 A1* | 2/2013 | Goetz et al. | 718/105 |

OTHER PUBLICATIONS

Brunsch et al., Designing an Efficient and Scalable Server-Side Asynchrony Model for CORBA, Aug. 2001, retrieved on Feb. 15, 2012, http://www.dre.vanderbilt.edu/~schmidt/PDF/AMH.pdf, Sec. 3, paragraph 2.

Brunsch et al., Designing an Efficient and Scalable Server-Side Asynchrony Model for CORBA, Aug. 2001, retrieved on Feb. 15, 2012, http://dl.acm.org/citation.cfm?id=384198.384227&preflayout=tabs.

European Patent Office, International Searching Authority, International Search Report and Written Opinion dated Mar. 25, 2013 for Application No. PCT/US2012/055586, 10 pages.

State Intellectual Property Office of the People's Republic of China, Search Report and First Office Actioin Dated May 5, 2016 for Chinese Application No. 201280044779.6, 23 Pages.

United States Patent and Trademark Office, Office Action Dated May 20, 2016 for U.S. Appl. No. 15/132,857, 30 Pages.

Pietzuch, Peter R. et al., "Hermes: A Distributed Event-Bsaed Middleware Architecture" Proceedings of the 22nd International Conference on Distributed Computing Systems Workshops © 2002 IEEE, 8 Pages.

European Patent Office, Extended European Search Report Dated July 26, 2016 for Application No. 12773156.0-1954 /2756430 PCT/US2012/055586, 9 Pages.

* cited by examiner

SYSTEM AND METHOD FOR HANDLING STORAGE EVENTS IN A DISTRIBUTED DATA GRID

CLAIM OF PRIORITY

This application claims the benefit of priority on U.S. Provisional Patent Application No. 61/535,238, entitled "UNIFIED EVENT MODEL FOR USE IN A DISTRIBUTED DATA GRID" filed Sep. 15, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The current invention relates to data caching and accessing techniques in distributed computing environments and more particularly to handling storage events in a distributed data grid.

BACKGROUND

In the context of distributed data management systems, event models are sometimes used to provide information about data changes. In a typical example, a client can register a listener to listen for a particular event on a piece of data. When the data changes, an event is generated and the client is informed of the event by way of a listener.

One limitation with this approach is that it is asynchronous in the sense that the event has already occurred, meaning that the client has no effective means to affect the data change because the client is informed after the event has already occurred. Thus, to make a change to the event, the client may be forced to perform a whole new transaction to make that change. Another limitation is often the size and the scalability of the solution because the client is registered to listen to all events in what is a frequently very large data set.

Additionally, various extensible hooks with different semantics and idiosyncratic forms of configuration are often presented to users as separate features. There can be little documentation about how these hooks relate to one another and it is not always clear which one is the most appropriate to use. In addition, the programming model varies for each hook, many of which have unique limitations.

A new solution is thus desirable, one which would address or resolve the above limitations as well as provide a number of other advantages.

SUMMARY

Described herein is a system and method that can handle storage events in a distributed data grid. The distributed data grid cluster includes a plurality of cluster nodes storing data partitions distributed throughout the cluster, each cluster node being responsible for a set of partitions. A service thread, executing on at least one of said cluster nodes in the distributed data grid, is responsible for handling one or more storage events. The service thread can use a worker thread to accomplish synchronous event handling without blocking the service thread.

DETAILED DESCRIPTION

In accordance with various embodiments, a system and method can handle storage events such as data partition transfer and storage entry events in a distributed data grid. The distributed data grid cluster includes a plurality of cluster nodes storing data partitions distributed throughout the cluster, each cluster node being responsible for a set of partitions. One exemplary distributed data grid is an Oracle® Coherence data grid. A service thread, executing on at least one of said cluster nodes in the distributed data grid, can be responsible for handling one or more storage events. The service thread can use a worker thread to accomplish synchronous event handling without blocking the service thread.

In accordance with various embodiments, the distributed data grid system can use a server-side event model, which can be implemented as a server-side event handling application programming interface (API), to support the raising and handling of server side events. Using a server-side event model in a distributed data grid system is disclosed in U.S. application Ser. No. 13/462,719, filed May 2, 2012, now U.S. Pat. No. 9,348,668, issued May 24, 2016, entitled "SYSTEM AND METHOD FOR SUPPORTING A SERVER-SIDE EVENT MODEL IN A DISTRIBUTED DATA GRID," which application is incorporated herein by reference in its entirety.

Storage Events

In accordance with an embodiment, storage events can be raised within the context of storage enabled members in a distributed data grid. The storage events can be defined as a set of interfaces that correspond to the functional area in which they are raised. These storage events can provide the infrastructure for various features provided by a distributed data grid, such as push replication and continuous aggregation.

Figure 1:
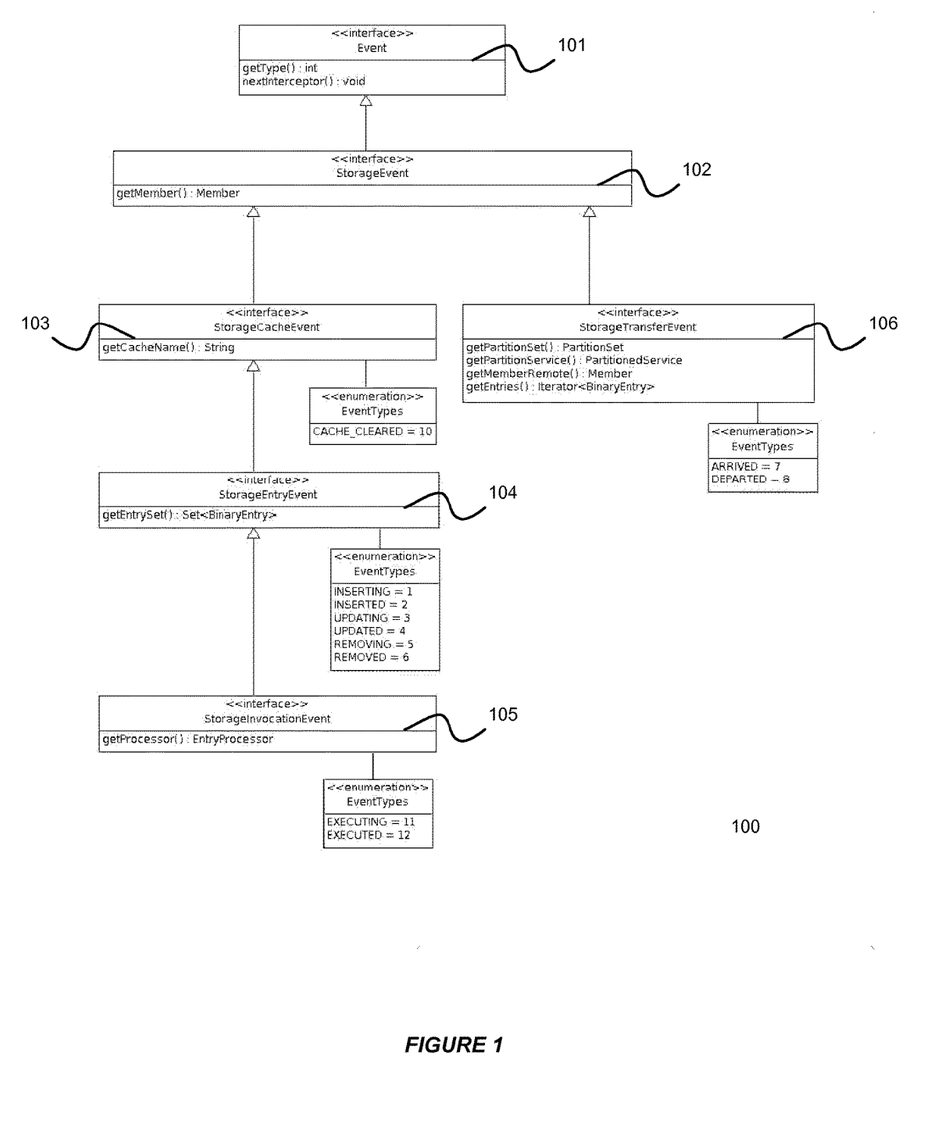
FIG. 1 shows an illustration of storage events in an event hierarchy in a distributed data grid, in accordance with an embodiment of the invention.

FIG. 1 shows an illustration of storage events in an event hierarchy in a distributed data grid, in accordance with an embodiment of the invention. As shown in FIG. 1, the Event interface 101 is the base of all Event objects in the system. Every event in the system can have one or more event types associated therewith. Consumers of an event can decide what action to perform based on the event type.

As shown in FIG. 1, the event hierarchy 100 also includes a StorageEvent interface 102 for a storage event. The StorageEvent interface extends directly from the Event interface. Additionally, the event hierarchy includes a StorageCacheEvent interface 103, a StorageEntryEvent interface 104, a StorageInvocationEvent interface 105, and a StorageTransferEvent interface 106 for different types of storage events.

Attached is Appendix A that provides further information regarding the various aspects of the storage events throughout this disclosure. The information in Appendix A is provided for illustrational purposes and should not be construed to limit all of the embodiments of the invention.

In accordance with an embodiment, the internal architecture of a distributed data grid supports raising storage events directly. The Coherence includes several components for handling the storage events: a PartitionedService component, a PartitionedCache component, and a PartitionedCache$Storage data structure.

The PartitionedService component is the base for clustered service components, which is responsible for managing and handling partition events including partition transfer events. The PartitionedCache component extends PartitionedService and is responsible for handling all distributed caching requests within a storage enabled member. The PartitionedCache component is also responsible for handling requests relating to partitioned cache operations (often referred to as distributed caches) and ultimately asking the underlying storage to perform the requested operation. The PartitionedCache$Storage component is the underlying data structure responsible for storing and managing entries on behalf of Coherence. Coherence can support various storage implementations and the $Storage component facilitates this functionality by providing an abstraction layer between the underlying storage implementations and the PartitionedCache service.

The Coherence includes various methods for handling storage events and supporting the data partition transfer. These methods include:

1. $PartitionedCache.transferPartition( ) to raise onStorageTransferEvent.DEPARTING,
2. $PartitionedService.transferPrimary( ) to support continuations, $PartitionedCache.receivePartition( ) to raise onStorageTransferEvent.ARRIVED,
3. $PartitionedService.onTransferRequest( ) to support continuations,
4. $PartitionedCache.onInvokeRequest( ) and $PartitionedCacheonInvokeAllRequest( ) to raise invocation events,
5. PartitionedCache$Storage.postInvoke( ) as a part of supporting invocation requests, $PartitionedCache.onPutRequest( )
6. $PartitionedCache.onPutAllRequest(  ),$PartitionedCache.onRemoveRequest( ) and $PartitionedCache.onRemoveAllRequest( ),
7. PartitionedCache$Storage.postPut(   ),PartitionedCache$Storage.postRemove( ), and publishChanges( ) to raise the StorageEntryEvent.INSERTED|UPDATED|DELETED events.

Additionally, the Coherence can include different methods and components for supporting continuation. These methods and components include: DispatchUEMevent (in which a message component can be posted back on to the service so that a worker thread can pick up the request to offload it from the service thread), DispatchTransferDeparting, DispatchTransferArrived, PostDeparted, and PostArrived.

Data Partition Transfer

Data partitions can be transferred between the data storage nodes of the distributed data grid. During a partition transfer, an internal transfer request can be sent from one server node to another along with the data that is to be transferred. Upon receiving the request, the recipient can store the data and inform the other cluster nodes that it is now responsible for storing that particular data partition.

Event interceptors can be injected in this critical path of the partition transfer so that events can be fired and actions can be inserted during the partition transfers. Additionally, the event interceptors can follow a synchronous model, which delays the partition transfer until the event interceptors have completed processing, allowing the event interceptors to complete their functionality before the partition transfer is completed.

In one example, the transferred data partition may contain information that relates to a trading account pending several trades, each of which changes the total amount of the trading account. The system can ensure that all trades are fully processed before the data partition transfer is committed, in order to avoid data corruptions of the total amount in the trading account.

In another example, a query can be performed over all the data in the data grid for the purpose of continuous aggregation. The system can ensure that every time after a data partition is transferred, the information on the related cluster node is updated, so that a query result can be quickly returned to the user.

In accordance with an embodiment, all these functionalities can occur on a single thread (e.g. service thread). Partition transfers can be performed on the service thread in order to ensure that the user can lock and unlock a set of partitions from the same thread (the service thread) when dealing with continuations.

In accordance with an embodiment, the synchronous event interceptor completion can be performed without blocking the service thread by supporting continuation. Partition transfer events can lead an event interceptor to iterate over an entire partition. If the main service thread is blocked for a significant period of time, latency can be introduced to the system, or a crash can occur.

The continuation support for the partition transfer events in a distributed data grid can be achieved by posting the storage events to the worker thread. In this manner, the event interceptors can be executed synchronously (complete before the transfer partition is completed) while at the same time without blocking the service thread. As a result, the service thread do not need to wait for the completion of the transfer partition and can continue executing requests while the second thread executes the continuation event dispatch.

Figure 2:
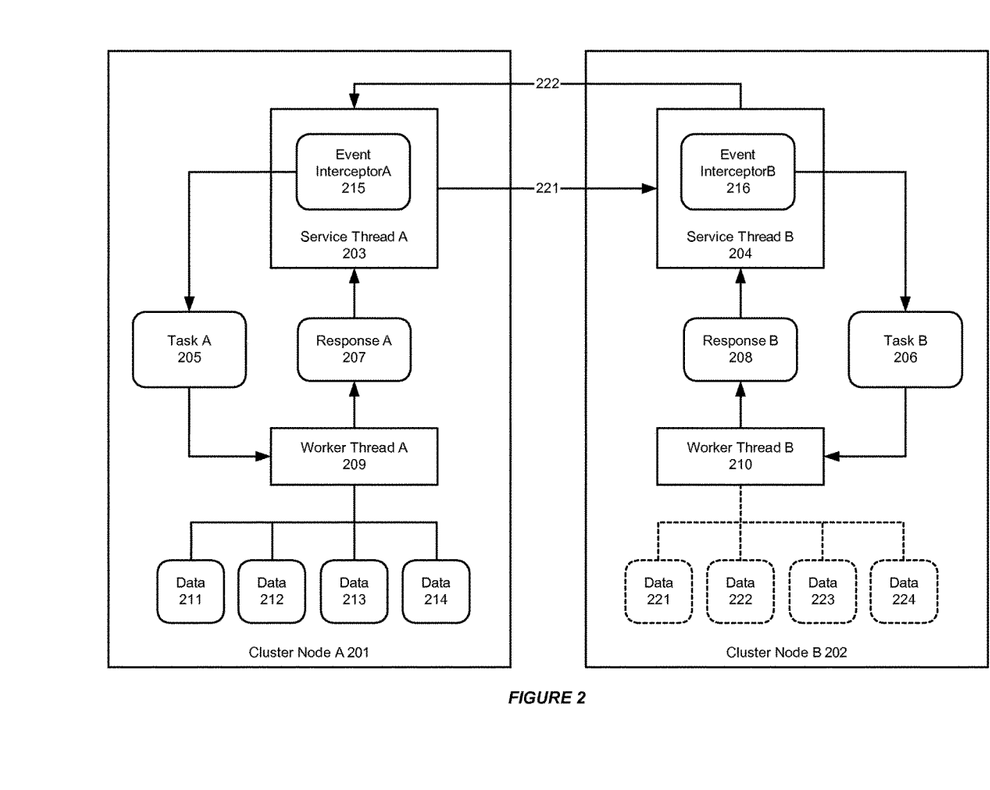
FIG. 2 shows an illustration of supporting data partition transfer within a distributed data grid, in accordance with an embodiment of the invention.

FIG. 2 shows an illustration of supporting data partition transfer within a distributed data grid, in accordance with an embodiment of the invention. As shown in FIG. 2, data partitions can be transferred from a cluster node A 201 to another cluster node 202.

The service thread 203 on the cluster node A can use a worker thread 209 to accomplish synchronous event intercepting without blocking the service thread. When the service thread receives an event or a request for handling an event, it can package the event up as a continuation (e.g. a data structure), which includes a task 205 to be executed by the worker thread. When the worker thread picks up the task, it can execute the task and post a response message 207 back to the service thread, which allows the handling of the event to switch back to the service thread, which can send a data partition transfer request to a service thread 204 on the cluster node B. In a similar fashion, the service thread on the cluster node B can dispatch a receiving task 206 to a worker thread 210 and receives a response when the data partition transfer operation is done. Finally, the receiving node, cluster node B, can send a message back to the sending node, cluster node A, as well as the rest of the cluster that it is responsible for the transferred data partition.

The following Listing 1 outlines a primary partition transfer workflow. In Coherence, a $PartitiondService.transferPrimary( ) method can be responsible for the flow of control with respect to transferring partitions. It is responsible for transferring a set of partitions at a time while keeping the partition transfers to a reasonable size on the wire. The following workflow can ensure that the system only switch the context once to raise the partition departing events.

---
Listing 1
---

```
If (pre-commit phase)
    a.  Loop over the available partitions locking the set that we want
        to transfer
    b.  If StorageTransferEvent.DEPARTING is enabled
        i.   Create a list of DispatchTransferDeparting events
    c.  Clear the partition set passed in
    d.  Loop over the set of locked partitions
        i.   If the transferControl is full
            1.  unlock the partition
        ii.  else
            1.  Raise the TRANSMIT_BEGIN partition event
            2.  if (listUEMDispatchers)
                a.  Create a DispatchTransferDeparting and add
                    the reference to the set of partitions that exist
                    in the method to it
                b.  Add the event from a to the
                    listUEMDispatchers
            3.  Call transferPartition pre-commit phase - passing in
                the DispatchUEMEvent
    e.  If (DispatchUEMEvent)
        i.   Loop over listUEMDispatchers adding each one
             to the EventDispatcher
    f.  else
        i.   Call the post-commit phase
else (post-commit phase)
    a.  Call transferPartition post-commit phase passing the
        DispatchTransferDeparting passed in from the response
    b.  Pull the set of partitions saved in the event as part of
        transferPartition in the flow (see below)
    c.  Increment the number of sent partitions (we'll need to save
        this as a shared reference in the DispatchUEMEvent as well)
    d.  If the size of the set of partitions from b == the count
        from c return the count from c
```

The following Listing 2 outlines a partition transfer workflow. In the example of Coherence, the partition transfer workflow can raise StorageTransferEvents at proper points and support passing an Iterator<BinaryEntries> to the data partition transfer events. A $PartitionedCache.transferPartition( ) method can gather all entries from a partition into a list to be transferred to another member, and raise the StorageTransferEvent.DEPARTING event for a particular partition. The partition transfer workflow can be embedded in the workflow for $PartitionedService.transferPrimary.

---
Listing 2
---

```
If (pre-commit phase)
    a.  Ensure that storage is valid
    b.  Create a list of resources to transfer
    c.  If (DispatchTransferDeparting)
        i.   Add the list of resources (entries) to the
             DispatchUEMEvent. This will need to placed into a
             WrapperSet that can translate the
             SimpleMapEntries into BinaryEntries.
```

---
-continued

Listing 2
---

```
Else (post-commit phase)
    a.  Create a list of map leases to transfer
    b.  Create a list of map listeners to transfer
    c.  Pull the list of resources off of the StorageTransferEvent stored
        by the DispatchUEMEvent
    d.  Send the TransferMessageRequest to the remote member with
        the above lists
```

Additionally, similar continuation flows can be implemented in $PartitionedService.onTransferRequest( ) and $PartitionedCache.receivePartition( ) methods for handling the StorageTransferEvent.DEPARTING event and the StorageTransferEvent.ARRIVED event. A DispatchTransferDeparting component can extend DispatchUEMEvent and be responsible for raising the StorageTransferEvent.DEPARTING event to the event dispatcher on the Coherence EventDispatcher thread. The runAfter method is responsible for posting the PostDeparted message back on the service thread. The PostDeparted message can extend the basic PartitionedCache$Acknowledgement component. A DispatchTransferArrived component can extend the DispatchUEMEvent and be responsible for raising the StorageTransferEvent.ARRIVED event to the event dispatcher on the Coherence EventDispatcher thread. The runAfter method is responsible for posting the PostArrived message back on the service thread. The PostArrived message can also extend the basic PartitionedCache$Acknowledgement component.

Figure 3:
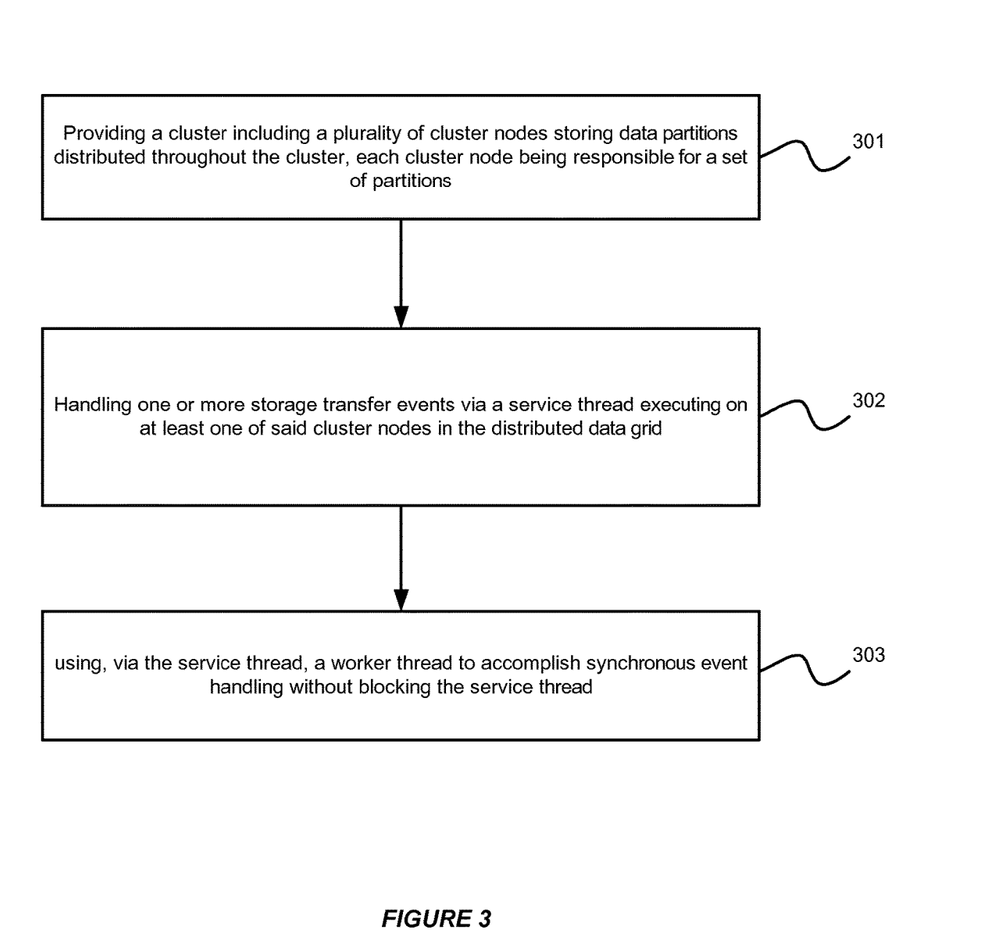
FIG. 3 illustrates an exemplary flow chart for supporting data partition transfer within a distributed data grid, in accordance with an embodiment of the invention.

FIG. 3 illustrates an exemplary flow chart for supporting data partition transfer within a distributed data grid, in accordance with an embodiment of the invention. As shown in FIG. 3, at step 301, a cluster can include a plurality of cluster nodes storing data partitions distributed throughout the cluster, with each cluster node being responsible for a set of partitions. Then, at step 302, a service thread, which executes on at least one of said cluster nodes in the distributed data grid, can handle one or more storage transfer events. Finally, at step 303, the service thread can use a worker thread to accomplish synchronous event handling without blocking the service thread.

Handling Storage Entry Events

In accordance with an embodiment, a set of event interceptors can be utilized in the distributed data grid for handling different storage events. An event interceptor can handle a pre-insert event, e.g. a storage entry event, and defer the completion of the data change pending the completion of the pre-insert event. This allows a server-side client to veto the event, or modify the event, before the handling of the event is completed. Additionally, the event interceptors allow raising post-events which are not mutable and cannot be used to veto the event for example, because they have already completed.

Figure 4:
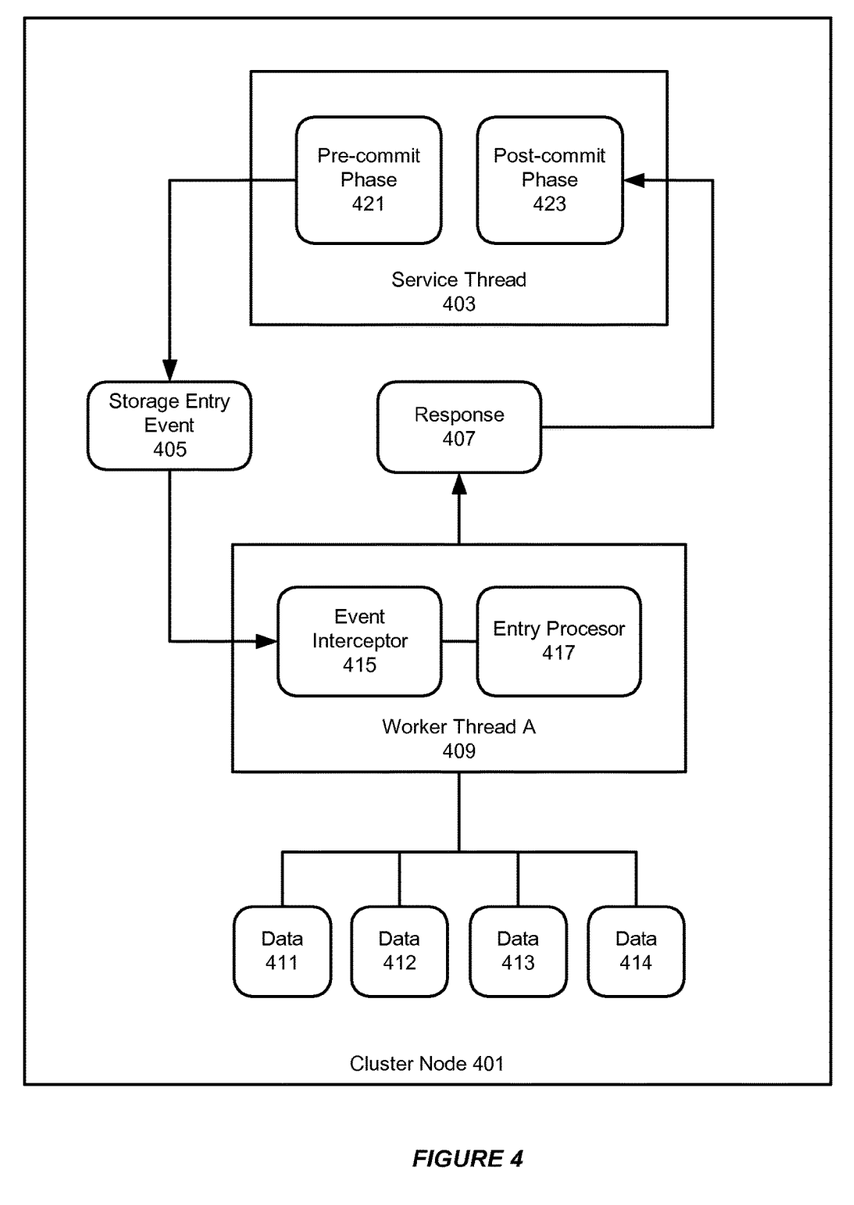
FIG. 4 shows an illustration of supporting a storage entry event within a distributed data grid, in accordance with an embodiment of the invention.

FIG. 4 shows an illustration of supporting a storage entry event within a distributed data grid, in accordance with an embodiment of the invention. As shown in FIG. 4, data partitions 411-414 can be created or modified on a cluster node 401. A service thread 403 can dispatch a storage entry event 405 to a worker thread 409 in a pre-commit phase 421 of request processing. The worker thread can execute one or more event interceptors 415, which handles the storage entry event using a storage entry processor 417. After the storage entry processor completes the storage entry operation, a response can be posted back to the service thread for a post-commit phase 423 of request processing.

It may not be feasible for an entry locking mechanism to lock a key on one thread, and unlock it from another. When multiple worker threads are in use, the system may not be able to control which worker thread will pick up the continuation. If a continuation model can not offload the requests, the INSERTING, UPDATING, and REMOVING storage entry events types need to be executed in the context of the thread processing the operation that triggers these events. In order to keep the service thread safe from user code, a server-side event model can allow that a service configured with event interceptors for these event types is also configured with worker threads.

For a pre-commit storage entry event, the execution of the event interceptors may not be completely isolated, because the pre-commit storage entry event can have the ability to stop/roll back a request by throwing an exception. In accordance with an embodiment, the pre-commit workflow knows whether the event interceptors finish processing an exception before moving forward to the commit phase of request processing. In order to isolate the execution of the event interceptors, continuation functionality can be added to each of the mutating operations on an data entry (e.g. INSERT, UPDATE, DELETE), such that the request handling can be set aside while the interceptor chains are executed on another thread (and picked up again once the interceptors finish handling the request).

In accordance with an embodiment, by executing the event interceptors on a worker thread instead of a service thread, the system allows the event interceptors to operate in a similar fashion as an entry processor. In Coherence, the following events can be run on a worker thread: StorageEntryEvent.INSERTING, StorageEntryEvent.UPDATING, and StorageEntryEvent.REMOVING The invocation workflow in Coherence can take into account not only the mutations made to storage, but also the execution of EntryProcessors on entries within storage. As such, handling of invocation requests requires the code to raise not only StorageInvocationEvents but also StorageEntryEvents. The onInvokeRequest( ) and onInvokeAllRequest( ) can be the entry points for raising events caused by invocations.

The following Listing 3 outlines an exemplary storage invocation workflow.

Interceptors can be triggered during this workflow on a worker thread while the entry or set of entries is locked for the before events and after the entry is unlocked for the after events.

Additionally, the workflows for onPutRequest, onPutAllRequest, onRemoveRequest, and onRemoveAll request can be similar. There can be corresponding methods for each of these operations (onPutRequest->Storage.put->storage.postPut etc.).

The following Listing 4 outlines the workflow for a put request, which can be replicated for operations such as putAll, remove and removeAll requests.

---
Listing 4
---

For an(each) entry
   Lock the entry.
   Call Storage.put
      Storage will update the entry in storage
         Call postPut( )
            processTriggers( )
            Raise the
            StorageEntryEvent.INSERTING|UPDATING|REMOVING
            event. (in-line). This code should
            the updated Binary is committed to storage by calling
            mapResource.put( ) or mapResource.putAll( )
   processChanges and other internal processing to support things like
backups (note backups are done asynchronously)
   unlock the entry or set of entries.

---

Again, interceptors can be triggered during this workflow on a worker thread while the entry or set of entries is locked for the before events and after the entry is unlocked for the after events. The above workflow for put/putall can be implemented for remove/removeAll as well.

Furthermore, in order to make sure that the system raises events for both standard modifications as well as out of band modifications, all the post modification events can be raised in the publishChanges( ) method.

The following Listing 5 outlines the workflow for publishChanges( ) which is a function called by processChanges( ) and is responsible for collecting all modifications in the current sandbox along with any eviction type changes and publishing them to storage.

---
Listing 3
---

Lock the entry or set of entries.
Raise the StorageInvocation.EXECUTING event (in line)
Call Storage.invoke( ) on the entry or set of entries.
   a.  Storage will invoke the EntryProcessor.process( ) or EntryProcessor.processAll methods.
   b.  Storage.postInvoke( ) will be called signifying that invocation has completed (note that
       postInvoke will be called for every entry that was updated during the processing of the
       EntryProcessor).
        i.  Triggers are fired
        ii.  Raise the StorageEntryEvent.UPDATING|INSERTING|REMOVING event (in-line)
        iii.  The updated Binary is committed to storage by calling putPrimaryResource( )
processChanges and other internal processing to support things like backups (note backups are
done asynchronously) are handled
   Raise the StorageInvocation.EXECUTED event (on the EventDispatcher)
   Unlock the entry or set of entries Listing 5

Figure 5:
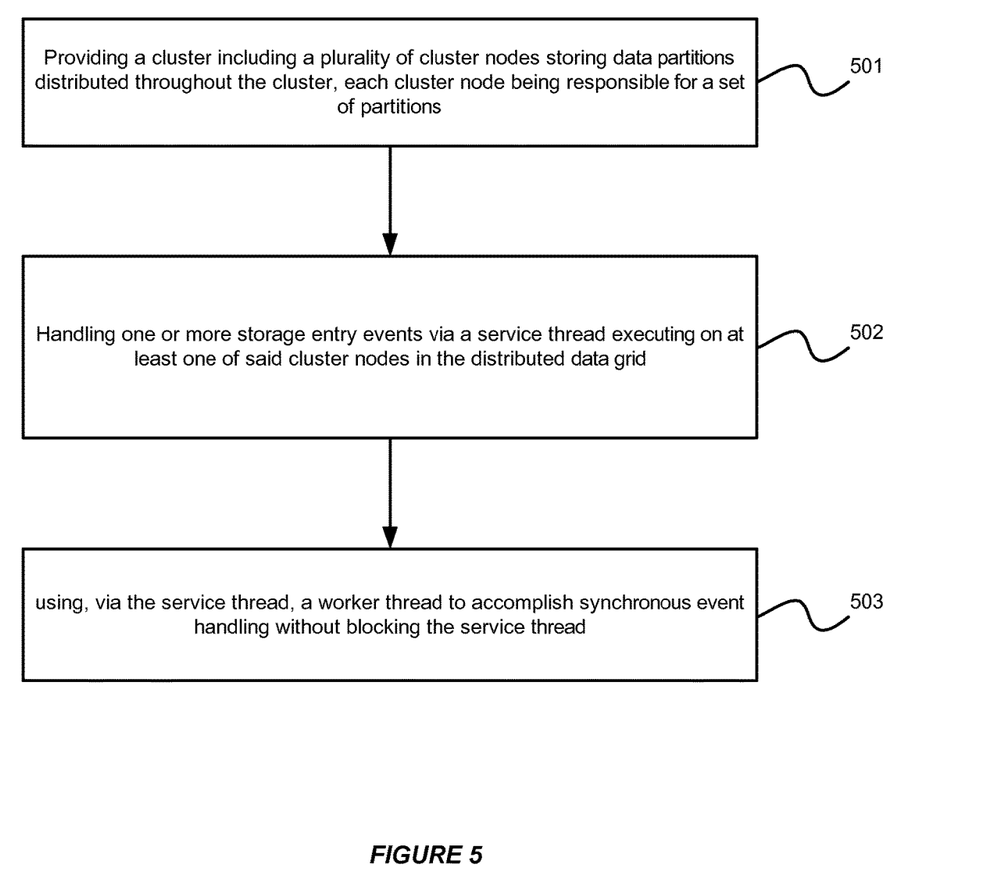
FIG. 5 illustrates an exemplary flow chart for supporting a storage entry event within a distributed data grid, in accordance with an embodiment of the invention.

Gather all the EntryStatus objects into a statusAll collection.
Iterate over each status object and
   a. If no action was performed on the entry remove it from the list
   b. If backups are needed and the result is not null add the key to the partition set for backup
   c. Accumulate the map events that need to be posted
   d. Prepare the backup messages
   e. Raise the StorageEntryEvents to the EventDispatcher. Note that in this method, publish changes will raise updates across instances of storage. At a minimum we should group together all the updates for each "cache" to potentially batch the updates together in this method.
   f. Unlock the locked keys FIG. 5 illustrates an exemplary flow chart for supporting a storage entry event within a distributed data grid, in accordance with an embodiment of the invention. As shown in FIG. 5, at step 501, a cluster can be provided including a plurality of cluster nodes storing data partitions distributed throughout the cluster, with each cluster node being responsible for a set of partitions. Then, at step 502, a service thread, which executes on at least one of said cluster nodes in the distributed data grid, can handle one or more storage entry events. Finally, at step 503, the service thread can use a worker thread to accomplish synchronous event handling without blocking the service thread.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

Appendix A

The following Listing 6 shows an exemplary Event interface. The Event interface is the base of all Events in the system. All Events in the system can have one or more event type associated with it. Consumers of an Event can decide what action to perform based on the event type.

Listing 6

```
/**
 * An {@link Event} object captures the necessary information required to
 * adequately describe
 * the activity that has occurred.
 *
 * Note that an {@link Event} object itself is immutable and its state is
 * only valid in the context
 * of a single chain of {@link
 * EventInterceptor#onEvent(EventContext, Event)} calls. Holding a
 * reference to the Event outside this scope or across calls is not safe.
 *
 */
public interface Event
{
    /**
     * Return the {@link Event}'s type
     *
     * @return the {@link Event}'s type
     */
    public int getType( );
    /**
     * Call the next {@link EventInterceptor} in the chain if one exists.
     * After each subsequent
     * intercepter has run this method will return giving the caller the
     * opportunity to observe any
     * side effects caused by down stream {@link EventInterceptor}s.
     * {@link EventInterceptor}s
     * that don't call this method will not prevent the chain from being
     * executed, they just won't
     * have the opportunity to see any side effects.
     */
    public void nextInterceptor( );
}
```

The following Listing 7 shows an exemplary StorageEvents interface. StorageEvents are Events that occurs for a specific named cache instance.

```
/**
 * A {@link StorageEvent} represents a storage side {@link Event} that
 * occurs for a specific
 * named cache instance.
 *
 */
public interface StorageEvent extends Event
{
    /**
     * The {@link Member} on which this event has been raised.
     *
```

```
 * @return the {@link Member} on which this event has been raised
 */
Member getMember( );
}
```

The following Listing 8 shows an exemplary Storage-CacheEvents interface. StorageCacheEvents are StorageEvents that can be raised on all storage members supporting a specific named cache. These represent global operations related to the named cache.

Listing 8

```
/**
 * A {@link} StorageCacheEvent captures information concerning actions
 * performed across all
 * storage members supporting a named cache.
 *
 */
public interface StorageCacheEvent
        extends StorageEvent
{
    /**
     * Return the cache name associated with this event.
     *
     * @return the cache name associated with this event
     */
    public String getCacheName( );
    /**
     * This {@link StorageCacheEvent} is dispatched afterall entries for
     * a cache have been
     * removed from this particular member.
     */
    public static final int CACHE_CLEARED = 10;
}
```

The following Listing 9 shows an exemplary StorageEntryEvents interface. StorageEntryEvents are StorageEvents that occurs on a specific Entry in a specific named cache instance. Some instances of this event will be raised before an operation on an Entry has been committed to storage. These before events allow the associated event interceptor to mutate the underlying Entry having these mutations committed to storage (similar to Triggers). Exceptions thrown from the before events prevent the operation from completing successfully and keep it from being committed to storage. Other instances of this event can be raised after an operation on an Entry has been committed to storage. In all of these after events, the contents of the underlying Entry are immutable.

Listing 9

```
/**
 * A {@link StorageEntryEvent} captures information concerning actions performed on or with
 * {@link BinaryEntry}s. Note that the semantics for interceptors handling these events is the
 * same as the semantics for {@link EntryProcessor}s.
 * From a concurrency model, interceptors will be dispatched on a worker thread while a lock is
 * held for the entry provided.
 *
 */
public interface StorageEntryEvent extends StorageCacheEvent
{
    /**
     * Returns the {@link BinaryEntry} on which the {@link StorageEntryEvent} occurred.
     *
     * @return the {@link BinaryEntry} on which the {@link StorageEntryEvent} occurred
     */
    Set<BinaryEntry> getEntrySet( );
    /**
     * This {@link StorageEntryEvent} is dispatched before a {@link BinaryEntry} is inserted into
     * storage.
     * This event is raised before the insert has been committed to storage. The following holds:
     * <ul>
     *     <li> The BinaryEntry provided for this event type is mutable.</li>
     *     <li> Throwing an exception from this event will prevent the operation from being
     *     committed to memory.</li>
     * </ul>
     */
    public static final int INSERTING = 1;
    /**
     * This {@link StorageEntryEvent} is dispatched after a {@link BinaryEntry} has been inserted
     * into storage.
     * This event is raised after the insert has been committed to storage but before the operation
     * has been backed up.
     * The BinaryEntry provided for this event type is immutable.
     */
    public static final int INSERTED = 2;
    /**
     * This {@link StorageEntryEvent} is dispatched before a {@link BinaryEntry} is updated in
     * storage.
     * This event is raised before the update has been committed to storage. The following holds:
     * <ul>
     *     <li> The BinaryEntry provided for this event type is mutable.</li>
     *     <li> Throwing an exception from this type of event will prevent the operation from being
     *     committed to memory.</li>
     * </ul>
     */
```

Listing 9

```
public static final int UPDATING = 3;
/**
 * This {@link StorageEntryEvent} is dispatched after a {@link BinaryEntry} has been updated
 * in storage on a
 * specific partition. The BinaryEntry provided for this event type is immutable.
 */
public static final int UPDATED = 4;
/**
 * This {@link StorageEntryEvent} is dispatched before an {@link BinaryEntry} has been
 * removed from storage.
 * This event is raised before the remove has been committed to storage. The following holds:
 * <ul>
 *   <li> The BinaryEntry provided for this event type is mutable.</li>
 *   <li> Throwing an exception from this type of event will prevent the operation from being
 *   committed to partition.</li>
 * </ul>
 */
public static final int REMOVING = 5;
/**
 * This {@link StorageEntryEvent} is dispatched after an {@link BinaryEntry} has been
 * removed from storage on a
 * specific partition. The BinaryEntry provided for this event type is immutable.</li>
 */
public static final int REMOVED = 6;
}
```

The semantics for writing EventInterceptors for StorageEntryEvents can match that of writing EntryProcessors. Using a concurrency model, interceptors handling this type of event can be dispatched on a worker thread with the Entry provided being locked.

The following Listing 10 shows an exemplary StorageInvocationEvents interface. StorageInvocationEvents are StorageEntryEvents and correspond to EntryProcessors that are being executed on a given member. StorageInvocationEvents can be raised before executing an EntryProcessor and after the results of the EntryProcessor have been committed to storage.

Listing 10

```
/**
 * The {@link StorageInvocationEvent} represents a storage
 * side event
 * corresponding to the invocation of an EntryProcessor.
 *
 */
public interface StorageInvocationEvent
        extends StorageEntryEvent
{
/**
 * Return the {@link EntryProcessor} associated with
 * this event.
 *
 * @return the {@link EntryProcessor} associated
 * with this event
 */
EntryProcessor getProcessor();
/**
 * This {@link StorageInvocationEvent} is raised prior
 * to executing an
 * EntryProcessor on an entry or set of entries. This event is
 * raised before
 * the insert has been committed to storage. The following holds:
 * <ul>
 *   <li>The BinaryEntry provided for this event type is
 *   mutable.</li>
 *   <li>Throwing an exception from this event will prevent the
 *   operation from being
 *   committed to memory.</li>
 * </ul>
 */
public static final int EXECUTING = 11;
/**
 * This {@link StorageInvocationEvent} is dispatched after
 * an {@link EntryProcessor} has been
 * executed and its result has been committed to storage.
 * The BinaryEntry provided in this event type is immutable.
 */
public static final int EXECUTED = 12;
}
```

The following Listing 11 shows an exemplary StorageTransferEvents interface StorageTransferEvents are StorageEvents that represent transfers of entries from one member to another. The semantics for writing EventInterceptors for StorageTransferEvents can be different from StorageEntryEvents. Event interceptors can be dispatched on a worker thread while a lock is held for the partition being transferred. This means that while handling a StorageTransferEvent the partition being transferred can be locked across the cluster.

Listing 11

```
/**
 * A {@link StorageTransferEvent} captures information concerning the transfer of partitions for
 * a specific storage enabled member.
 * Transfer events are raised against the set of {@link BinaryEntry}s that are being transferred.
 * Note that when {@link StorageTransferEvent}s are raised, {@link StorageEntryEvent}s will not
 * be raised. If there is interest in the movement of entries from one member to another, you
```

-continued

Listing 11

```
 * must intercept {@link StorageTransferEvents}. In addition, it's important to realize that when a
 * {@link StorageTransferEvent} is being handled, a lock is held on the set of partitions for the
 * data being transferred preventing write operations for that entire partition set.
 *
 */
public interface StorageTransferEvent extends StorageTransferEvent
    {
    /**
     * Returns the {@link PartitionSet} to which the {@link StorageTransferEvent} applies.
     *
     * @return the {@link PartitionSet} to which the {@link StorageTransferEvent} applies
     */
    int getPartitionId( );
    /**
     * Returns the {@link PartitionedService} on which the {@link StorageTransferEvent}
occurred.
     *
     * @return the {@link PartitionedService} on which the {@link StorageTransferEvent}
occurred
     */
    PartitionedService getPartitionService( );
    /**
     * The remote {@link Member} associated with this transfer operation.
     * For a {@link #DEPARTED} event, this would be
     * the member the entries are being transferred to. For a {@link #ARRIVED} event, this would
     * be the member the entries are being transferred from.
     *
     * @return the remote {@link Member} associated with the instance of this storage transfer
     * event
     */
    Member getRemoteMember( );
    /**
     * Return the {@link BinaryEntry}s associated with this storage transfer event.
     * @return
     */
    List<BinaryEntry> getEntries( );
/**
     * This {@link StorageTransferEvent} is dispatched when a set of {@link BinaryEntry}s are
     * being transfered from the current member. When this event is raised the partition that is
     * departing is no longer owned by the current member, but the values will still be in the
     * backing map. Note that while this event is being executed a lock on the partition being
     * transferred is held preventing any write operations for the partition.
     * The {@link BinaryEntry}s provided from {@link #getEntries( )} will be immutable.
     */
    public static final int DEPARTING = 7;
    /**
     * This {@link StorageTransferEvent} is dispatched when a set of {@link BinaryEntry}s has
     * been transferred to the current member. When this event is raised, the partition is owned
     * by the current member and the entries will not yet be in the backing map. Note that while
     * this event is being executed a lock on the partition being transferred is held preventing
     * any write operations for the partition.
     * The {@link BinaryEntry}s provided from {@link #getEntries( )} will be immutable.
     */
    public static final int ARRIVED = 8;
}
```

What is claimed is:

1. A method for handling data partition transfer events in a distributed data grid comprising a first cluster node storing first plurality of data partitions and a second cluster node storing a second plurality of data partitions, said method comprising:

initiating a partition transfer event on said first cluster node for transferring a first data partition of said first plurality of data partitions from said first cluster node to said second cluster node;

handling said partition transfer event on a first service thread executing on said first cluster node in the distributed data grid;

packaging said data partition transfer event on said first service thread as a continuation data structure including a partition transfer task;

using a first worker thread executing on said first cluster node to pick up the continuation data structure and execute said partition transfer task to accomplish synchronous handling of said partition transfer task without blocking the first service thread;

posting a response from the first worker thread to the first service thread indicating completion of said partition transfer task; and in response to receiving said response from the first worker thread, sending a partition transfer request from the first service thread on said first cluster node to a second service thread on said second cluster node.

2. The method of claim 1, further comprising raising the partition transfer event in a critical path of modifying a specific entry in the distributed data grid.

3. The method of claim 1, further comprising raising the partition transfer event in a critical path of transferring data partitions among cluster nodes of the distributed data grid.

4. The method of claim 3, wherein said partition transfer request includes data of said first data partition to be transferred from said first cluster node to said second cluster node.

5. The method of claim 1, further comprising:
receiving said partition transfer request from the first service thread on said first cluster node at the second service thread on said second cluster node;
packaging said partition transfer request on said second service thread as another continuation data structure; and
using a second worker thread executing on said second cluster node to pick up the another continuation data structure to accomplish synchronous handling of said partition transfer request without blocking the second service thread.

6. The method of claim 5, further comprising:
posting another response from the second worker thread to the second service thread indicating completion of said partition transfer request.

7. The method of claim 5, wherein receiving the partition transfer request comprises receiving data of said first data partition.

8. The method of claim 1, further comprising using, via the second service thread, another worker thread to receive the partition transfer request without blocking the second service thread.

9. The method of claim 3, further comprising providing a server-side event application programming interface (API) that includes an event interceptor that processes the partition transfer event, and wherein the cluster defers completion of the partition transfer event pending the completion of the event interceptor.

10. The method of claim 9, further comprising executing the event interceptor on the first worker thread.

11. A non-transitory computer readable medium including instructions stored thereon for handling data partition transfer event in a distributed data grid comprising a plurality of cluster nodes including a first cluster node storing first plurality of data partitions and a second cluster node storing a second plurality of data partitions, which instructions, when executed, cause the distributed data grid to perform steps comprising:
initiating a partition transfer event on said first cluster node for transferring a first data partition of said first plurality of data partitions from said first cluster node to said second cluster node;
handling said partition transfer event on a first service thread executing on said first cluster node in the distributed data grid;
packaging said data partition transfer event on said first service thread as a continuation data structure including a partition transfer task;
using a first worker thread executing on said first cluster node to pick up the continuation data structure and execute said partition transfer task to accomplish synchronous handling of said partition transfer task without blocking the first service thread;
posting a response from the first worker thread to the first service thread indicating completion of said partition transfer task; and
in response to receiving said response from the first worker thread, sending a partition transfer request from the first service thread on said first cluster node to a second service thread on said second cluster node.

12. The non-transitory computer readable medium of claim 11 including further instructions stored thereon, which, when executed, cause the distributed data grid to perform further steps comprising:
raising the partition transfer event in a critical path of transferring the first data partition from the first cluster node to the second cluster node.

13. The non-transitory computer readable medium of claim 12 including further instructions stored thereon, which, when executed, cause the distributed data grid to perform further steps comprising:
receiving the partition transfer request including data of said first partition at the second cluster node using the second service thread executing on said second cluster node.

14. The non-transitory computer readable medium of claim 11, including further instructions stored thereon, which, when executed, cause the distributed data grid to perform further steps comprising:
receiving the partition transfer request including data of said first partition at the second cluster node using the second service thread executing on said second cluster node;
packaging said partition transfer request on said second service thread as another continuation data structure;
using a second worker thread executing on said second cluster node to pick up the another continuation data structure to accomplish synchronous handling of said partition transfer request without blocking the second service thread.

15. The non-transitory computer readable medium of claim 11 including further instructions stored thereon, which, when executed, cause the distributed data grid to perform further steps comprising:
providing a server-side event application programming interface (API) that includes an event interceptor that processes the partition transfer event; and
deferring transferring data partitions pending the completion of processing the partition transfer event using the event interceptor.

16. The non-transitory computer readable medium of claim 15, including further instructions stored thereon, which, when executed, cause the distributed data grid to perform further steps comprising:
executing the event interceptor on the first worker thread.

17. A system comprising:
a distributed data grid comprising a plurality of cluster nodes, a first cluster node storing first plurality of data partitions and a second cluster node storing a second plurality of data partitions, distributed throughout the cluster, wherein each cluster node comprises a microprocessor and a memory;
wherein the distributed data grid is configured to,
initiate a partition transfer event on said first cluster node for transferring a first data partition of said first plurality of data partitions from said first cluster node to said second cluster node,
handle said partition transfer event on a first service thread executing on said first cluster node in the distributed data grid,
package said data partition transfer event on said first service thread as a continuation data structure including a partition transfer task,
use a first worker thread executing on said first cluster node to pick up the continuation data structure and execute said partition transfer task to accomplish synchronous handling of said partition transfer task without blocking the first service thread;

post a response from the first worker thread to the first service thread indicating completion of said partition transfer task, and in response to receiving said response from the first worker thread, send a partition transfer request from the first service thread on said first cluster node to a second service thread on said second cluster node.

18. The system of claim 17, wherein the distributed data grid is further configured to initiate the partition transfer event in a critical path of transferring the first partition from the first cluster node to the second cluster node using an event interceptor.

19. The system of claim 17, wherein the distributed data grid is further configured to:

receive said partition transfer request from the first service thread on said first cluster node at the second service thread on said second cluster node;

package said partition transfer request on said second service thread as another continuation data structure; and use a second worker thread executing on said second cluster node to pick up the another continuation data structure to accomplish synchronous handling of said partition transfer request without blocking the second service thread.

20. The system of claim 17, wherein the distributed data grid is further configured to:

provide a server-side event application programming interface (API) that includes an event interceptor that processes the partition transfer event on said first worker thread, and defer transferring said first data partition pending the completion of processing the partition transfer event using the event interceptor on said first worker thread.

* * * * *

UNITED STATES PATENT AND TRADEMARK OFFICE
CERTIFICATE OF CORRECTION

| | | |
|---|---|---|
| PATENT NO. | : 9,621,409 B2 | Page 1 of 1 |
| APPLICATION NO. | : 13/462720 | |
| DATED | : April 11, 2017 | |
| INVENTOR(S) | : Oliver et al. | |

It is certified that error appears in the above-identified patent and that said Letters Patent is hereby corrected as shown below:

On the Title Page

On page 2, Column 2, item [56], under Other Publications, Line 11, delete "Actioin" and insert -- Action --, therefor.

On page 2, Column 2, item [56], under Other Publications, Line 15, delete "Event-Bsaed" and insert -- Event-Based --, therefor.

In the Drawings

On sheet 4 of 5, in FIGURE 4, under Reference Numeral 417, Line 1, delete "Procesor" and insert -- Processor --, therefor.

In the Specification

Column 3, Line 52, after "PutRequest( )" insert -- , --.

Column 7, Line 38, after "REMOVING" insert -- . --.

Column 8, Lines 44-45, delete "publishChanges( )" and insert -- publishChanges( ), --, therefor.

Column 10, Line 43, delete "intercepter" and insert -- interceptor --, therefor.

Column 13, Line 56, delete "getProcessor();" and insert -- getProcessor( ); --, therefor.

Column 15, Line 39, delete "transfered" and insert -- transferred --, therefor.

Column 15, Line 48, delete "transfered" and insert -- transferred --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*